United States Patent [19]
Kelly et al.

[11] Patent Number: 6,046,126
[45] Date of Patent: Apr. 4, 2000

[54] TITANIUM PROCESS FOR MAKING CATALYST

[76] Inventors: Mark Kelly, 118 Meadow Brook Bay, Airdrie, Alberta, Canada, T4A 2B3; Dusan Jeremic, 240 Sandstone Drive NW, Calgary, Alberta, Canada, T3K 3S6; Victoria Ker, 120 Harvest Hills Drive NE, Calgary, Alberta, Canada, T3K 3X4; Charles Russell, 12 Lake Simcoe Green SE, Calgary, Alberta, Canada, T2J 5R7

[21] Appl. No.: 09/076,515

[22] Filed: May 12, 1998

[51] Int. Cl.[7] ............................... B01J 31/38; B01J 31/26
[52] U.S. Cl. .................. 502/104; 502/107; 502/110; 502/128; 502/132; 502/133; 502/224; 502/226; 502/227; 502/231
[58] Field of Search ................. 502/104, 107, 502/110, 132, 133, 128, 224, 226, 227, 231

[56] References Cited

U.S. PATENT DOCUMENTS

| | | | |
|---|---|---|---|
| 4,190,555 | 2/1980 | Takamura et al. | 502/107 |
| 4,288,648 | 9/1981 | Beach et al. | 585/523 |
| 4,302,566 | 11/1981 | Karol et al. | 526/125 |
| 4,309,521 | 1/1982 | Sato et al. | 526/114 |
| 4,324,691 | 4/1982 | Hartshorn et al. | 502/110 |
| 4,452,914 | 6/1984 | Coleman, III et al. | 502/122 |
| 4,876,229 | 10/1989 | Furtek | 502/107 |
| 5,028,673 | 7/1991 | Pettijohn et al. | 526/159 |
| 5,032,560 | 7/1991 | Bailly et al. | 502/10 |
| 5,102,840 | 4/1992 | Pettijohn et al. | 502/103 |
| 5,110,884 | 5/1992 | Pettijohn et al. | 526/114 |
| 5,137,996 | 8/1992 | Bailly et al. | 502/104 |
| 5,173,464 | 12/1992 | Pettijohn et al. | 502/104 |
| 5,260,244 | 11/1993 | Pettijohn | 502/115 |
| 5,350,816 | 9/1994 | Pettijohn | 526/114 |
| 5,387,568 | 2/1995 | Ewen et al. | 502/104 |
| 5,514,728 | 5/1996 | Lamanna et al. | 522/31 |
| 5,633,419 | 5/1997 | Spencer et al. | 585/522 |
| 5,908,594 | 6/1999 | Gownder et al. | 264/210.7 |

FOREIGN PATENT DOCUMENTS

| | | | |
|---|---|---|---|
| 453088B1 | 7/1996 | European Pat. Off. | C08F 4/654 |
| 744416A1 | 11/1996 | European Pat. Off. | C08F 10/00 |
| 595574B1 | 1/1997 | European Pat. Off. | C08F 110/02 |

OTHER PUBLICATIONS

Gas Phase Ethylene Polymerization: Production Processes, Polymer Properties, and Reactor Modeling, Ind. Eng. Chem. Res. 1994, 33, 449–479.

*Primary Examiner*—Yogendra Gupta
*Assistant Examiner*—Christine Ingersoll
*Attorney, Agent, or Firm*—Kenneth H. Johnson

[57] ABSTRACT

The present invention provides a novel process for preparing a catalyst, preferably free of electron donor, useful in gas phase polymerization of olefins having a broad polydispersity.

13 Claims, No Drawings

TITANIUM PROCESS FOR MAKING CATALYST

FIELD OF THE INVENTION

The present invention relates to supported Ziegler-Natta catalysts which are useful in olefin polymerization, and more particularly in the fluidized gas phase polymerization of alpha-olefins.

BACKGROUND OF THE INVENTION

Ziegler-Natta type catalysts are well known and have been used since the early 1950's. Generally the catalyst comprises a transition metal compound, typically titanium in the 3 or 4 valence state (e.g. $TiCl_3$ or $TiCl_4$) together with at least one activator, typically an aluminum compound such as a trialkyl aluminum (e.g. triethylaluminum (TEAL)) or an alkyl aluminum halide (e.g. diethylaluminum chloride (DEAC)) and the like. The catalysts may contain magnesium chloride which may be generated from a dialkyl magnesium compound and active chloride. Typically, the catalysts are prepared in conjunction with an electron donor which tends to narrow the molecular weight distribution in the resulting polymer. A good description of these types of catalysts is contained in U.S. Pat. No. 4,302,566 issued Nov. 24, 1981 to Karol et al., assigned to Union Carbide Corporation. Karol teaches that it is essential to use an electron donor in the preparation of the catalyst. The use of an electron donor has been eliminated from the catalysts of the present invention.

U.S. Pat. No. 5,633,419 issued May 27, 1997 to The Dow Chemical Company discloses a supported Ziegler-Natta type catalyst or catalyst precursor. However, it is a limitation of the reference that the halide is used in the form of a hydrogen halide (e.g. HCl). The reference teaches away from the subject matter of the present invention which is limited to the use of alkyl halides as the halide source. Additionally, the reference appears to teach the use of a support such as silica, which has been treated either thermally or chemically, but not both, which is contrary to the method for preparing the support of the present invention.

European Patent Application 0 744 416 published Nov. 27, 1996 in the name of BP Chemicals Limited (BP) teaches supported catalysts and catalyst precursors. The reference teaches that the support is reacted with either the aluminum compound or the magnesium compound but not a concurrent treatment with a mixture of aluminum and magnesium (e.g. MAGALA, a mixture sold by Akzo). The reference teaches against the addition of a second aluminum compound. Additionally, in view of the examples, the BP patent strongly suggests that an electron donor needs to be used in the preparation of the catalyst, a feature that has been eliminated from the present invention. This reference also teaches that the halogenating agent must be used in a molar ratio such that all of the Mg and Al compounds are converted to their respective halides, a limitation which is not put on the present invention. That is, in accordance with the present invention, there is an excess of aluminum and magnesium over reactive halide so that not all of the aluminum and magnesium is precipitated.

BP patent EP 0 595 574 B1 granted in Jan. 2, 1997 requires that the catalyst be prepared on a support treated with an organosilicon compound. The supports used in accordance with the present invention are treated thermally and chemically (aluminum alkyls) but not with organosilicon.

BP patent EP 0 453 088 B1 granted in Jul. 31, 1997 teaches that the catalyst be made on dehydrated silica and that the catalyst needs to be pre-polymerized to obtain a useful catalyst for the synthesis of linear low density polyethylene (LLDPE). The catalysts of the present invention do not need to be pre-polymerized to be useful for the polymerization of ethylene to LLDPE. The patent teaches about washing the catalyst to remove excess Mg compounds which is not relevant to our catalyst. This patent also teaches about the need for high Ti:(Mg+Al) ratios, a restriction which is removed in the present invention.

The present invention seeks to provide a supported Ziegler-Natta type catalyst which is preferably prepared in the absence of an electron donor, and provides a polymer having a broad molecular weight distribution. The present invention relates to supported Ziegler-Natta catalysts which are useful in olefin polymerization, and more particularly in the fluidized gas phase polymerization of alpha-olefins.

SUMMARY OF THE INVENTION

The present invention provides a process conducted in a hydrocarbon solvent at a temperature from 0° C. to 100° C. for preparing a catalyst for the gas phase polymerization of alpha-olefins comprising:

a. contacting a dehydrated silica support containing from 0.1 to 3 weight % aluminum having the formula $Al^1(R^1)_a X_b$ wherein each $R^1$ is independently selected from the group consisting of $C_{1-10}$ alkyl radicals, X is selected from the group consisting of Cl and Br, a and b are 0 or an integer from 1 to 3 provided the sum of a+b=3 with;

b. a titanium compound of the formula $Ti(R^5)_y(Cl)_z$, wherein each $R^5$ is selected from the group consisting of $C_{1-10}$ alkyl and alkoxide radicals and phenyl radicals which are unsubstituted or substituted by a $C_{1-4}$ alkyl radical, y and z are 0 or an integer from 1 to 4 and the sum of y+z=4 to provide from 0.1 to 1.5 weight % of Ti based on the silica and contacting the resulting product with;

c. in any order or in combination; (i) an aluminum compound of the formula $Al^2(R^2)_n X_m$ wherein each $R^2$ is independently selected from the group consisting of $C_{1-10}$ alkyl radicals, X is selected from the group consisting of Cl and Br, m and n are 0 or an integer from 1 to 3 provided the sum of n+m=3, and (ii) $Mg(R^3)_2$ wherein each $R^3$ is independently selected from the group consisting of $C_{1-10}$ alkyl radicals wherein the molar ratio of $Mg:Al^2$ in said mixture is from 0.5:1 to 25:1 to provide from 0.25 to 8.0 weight % of Mg based on the weight of silica used and contacting the resulting product with;

d. carbon tetrachloride ($CCl_4$) or a secondary or tertiary alkyl halide of the formula $R^4Cl$ wherein $R^4$ is selected from the group consisting of $C_{3-6}$ alkyl radicals to produce a Cl:Mg molar ratio from 1:1 to 8:1 in the resulting product.

In a further embodiment of the present invention in the above process after step d there is added from 0 up to 0.3 mmol of electron donor per g of silica.

The present invention also provides a gas phase process for the polymerization, at a pressure from 10 to 500 psi, of a mixture comprising from 0 to 15 mole % of hydrogen, from 0 to 30 mole % of one or more $C_{3-8}$ alpha-olefins, from 15 to 100 mole % of ethylene and from 0 to 75 mole % of an inert gas such as $N_2$, conducted at a temperature from 50° C. to 120° C. in the presence of a catalyst as described above preferably in the absence of an electron donor.

The present invention further provides a polymer comprising from 0 to 15 mole % of one or more $C_{3-8}$ alpha-olefins, from 85 to 100 mole % of ethylene having a molecular weight (Mw) greater than 50,000 and a polydispersity ($M_w/M_n$) from 3.5 to 7 prepared according to the above process.

BEST MODE

The supports useful in accordance with the present invention typically comprise a substrate of alumina or silica having a pendant reactive moiety. The reactive moiety may be a siloxy radical or more typically is a hydroxyl radical. The preferred support is silica or alumina. The support should have a particle size from about 10 to 250 microns, preferably from about 30 to 150 microns. The support should have a large surface area typically greater than about 3 $m^2/g$, preferably greater than about 50 $m^2/g$, most preferably from 100 $m^2/g$ to 1,000 $m^2/g$. The support will be porous and will have a pore volume from about 0.3 to 5.0 ml/g, typically from 0.5 to 3.0 ml/g. Supports, which are specifically designed to be an agglomeration of subparticles while useful, are not required.

It is important that the support be dried prior to the initial reaction with an aluminum compound. Generally the support may be heated at a temperature of at least 200° C. for up to 24 hours, typically at a temperature from 500° C. to 800° C. for about 2 to 20 hours. The resulting support will be free of adsorbed water and should have a surface hydroxyl content from about 0.1 to 5 mmol/g of support, preferably from 0.5 to 3 mmol/g.

The first aluminum ($Al^1$) is deposited upon the support by contacting the support, preferably silica, with an anhydrous solution of an aluminum alkyl of the formula $Al^1 (R^1)_a X_b$ wherein each $R^1$ is independently selected from the group consisting of $C_{1-10}$ alkyl radicals, preferably $C_{1-6}$ alkyl radicals, X is selected from the group consisting of Cl and Br, preferably Cl and a and b are 0 or an integer from 1–3 provided the sum of a+b=3. Most preferably, $R^1$ is selected from the group consisting of methyl, ethyl and butyl radicals. Preferably, b is 0. From a commercial viewpoint, the most available compound is triethylaluminum (TEAL).

The support is reacted with an aluminum compound such that the amount of aluminum on the support is from about 0.1 to about 3 weight %, preferably from about 0.5 to about 2 weight %, based on the weight of the silica.

The resulting treated support may then be reacted with the remaining components in the specified order.

The titanium in the catalyst is provided by a compound of the formula $Ti(R^5)_y Cl_z$ wherein each $R^5$ is independently selected from the group consisting of $C_{1-10}$ alkyl and alkoxide radicals and phenyl radicals which are unsubstituted or substituted by a $C_{1-4}$ alkyl radical, and y and z are 0 or an integer from 1 to 4 provided that the sum of y+z=4. Preferably, $R^5$ is selected from the group consisting of $C_{2-6}$ alkyl and alkoxy radicals and phenyl and benzyl radicals. The titanium compound is added in an amount to provide from 0.1 to 1.5 weight % of titanium based on the weight of the silica. Preferably, the titanium is present in an amount from 0.25 to 1.0 weight % based on the weight of the silica. In one embodiment of the invention, y is 0.

The second aluminum component in the catalyst is of the formula $A^2(R^2)_n X_m$ wherein each $R^2$ is independently selected from the group consisting of $C_{1-10}$ alkyl radicals, preferably $C_{1-6}$ alkyl radicals, X is selected from the group consisting of Cl and Br, preferably Cl and n and m are 0 or an integer from 1 to 3 provided the sum of n+m=3. Most preferably, $R^2$ is selected from the group consisting of methyl, ethyl and butyl radicals. Preferably, m is 0. The second aluminum compound may be the same or different from the first aluminum compound. The amount of the second aluminum (e.g. $Al^2$) is such that it will provide from about 0.20 to 4.0 weight % of the catalyst based on the weight of the silica.

The magnesium component in the catalyst will have the formula $Mg(R^3)_2$ wherein each $R^3$ may be independently selected from the group consisting of $C_{1-10}$ alkyl radicals, preferably $C_{1-6}$ alkyl radicals. More preferably, $R^3$ is selected from the group consisting of ethyl and butyl radicals. Some suitable magnesium compounds include dibutyl-magnesium and butyl-ethyl-magnesium. The magnesium is used in an amount to provide from 0.25 to 8.0 weight % based on the weight of the silica, preferably from 0.5 to 4.0 weight % based on the weight of the silica. The molar ratio of $Mg:Al^2$ may range from 0.5:1 to 25:1, preferably from 0.5:1 to 16:1.

The $Al^2$ and Mg may be added as a mixed compound (such as the commercially available MAGALA, a product supplied by Akzo) or sequentially in any order. That is to say, $Al^2$ can be added first followed by the Mg compound or the Mg compound can be added first followed by $Al^2$.

The halide in the catalyst is provided by $CCL_4$ or by a secondary or tertiary halide of the formula $R^4Cl$ wherein $R^4$ is selected from the group consisting of $C_{3-6}$ alkyl radicals. Suitable chlorides include sec-butyl chloride, t-butyl chloride and sec-propyl chloride. The halide is added to the support in a quantity of 2 to 30 weight %, preferably from 5 to 20 weight % based on the weight of silica. The Cl:Mg molar ratio should be from 1:1 to 8:1, preferably from 1.5:1 to 6:1.

The catalysts of the present invention will have: a molar ratio of total aluminum ($Al^1+Al^2$):Mg from 0.1:1 to 3:1; preferably from 0.4:1 to 3:1; preferably a molar ratio of halide (Cl) to 2 Mg+3($Al^1+Al^2$) from 0.25:1 to 4:1; an amount of organic halide from 0.2 to 5 mmol per g of silica; an amount of Mg from 0.1 to 3.5 mmol per g of silica; a total amount of aluminum to provide from 0.3 to 3.0 mmol of aluminum per g of silica; a molar ratio of titanium to aluminum and magnesium (e.g. Ti:(Al+Mg)) from 0.01:1 to 0.15:1, preferably from 0.02:1 to 0.085:1; an amount of Ti to provide from 0.02 to 0.32 mmol of Ti per g of silica; a molar ratio of Ti:Mg from 0.04:1 to 0.4:1.

The process to prepare the catalyst may be conducted at temperatures from 0° C. to 100° C., typically at temperatures from 5° C. to 80° C. The individual components (e.g. silica comprising aluminum compound, magnesium compound, second aluminum compound, halide (chloride) compound and titanium compound) are suspended or dissolved in a hydrocarbon medium. The solvent used in the preparation of the catalyst is an inert $C_{5-10}$ hydrocarbon which may be unsubstituted or substituted by a $C_{1-4}$ alkyl radical, such as a hydrocarbon that is inert with respect to the catalyst. Such solvents are known and include, for example: pentane, hexane, heptane, octane, cyclohexane, methylcyclohexane, and hydrogenated naphtha.

After each addition of a compound to the support, the resulting product may or may not be isolated. For example, the solvent is removed at least once prior to step d, and after step d. When isolated, the drying step may be conducted by maintaining the reactants at a temperature from 5° C. to 80° C., preferably from 30° C. to 80° C., by passing or purging a dry inert gas such as nitrogen through the reactants. The drying may also be conducted at a reduced pressure under vacuum at a temperature from 10° C. to 80° C. and at a pressure from 0.1 to 500 mm Hg (torr), preferably less than 400 torr (66.65 kPa, preferably less than 53.33 kPa).

The catalyst is recovered as a free flowing powder. The catalyst is then used in combination with a co-catalyst, typically an aluminum compound such as an aluminum alkyl, in the gas phase polymerization of a gaseous mixture comprising from 0 to 15 mole % of hydrogen, from 0 to 30 mole % of one or more $C_{3-8}$ alpha-olefins, from 15 to 100 mole % of ethylene, and from 0 to 75 mole % of an inert gas at a temperature from 50° C. to 120° C., preferably from 75° C. to about 110° C., and at pressures typically not exceeding 3447 kPa (about 500 psi), preferably not greater than 2414 kPa (about 350 psi). Preferably, the catalyst is used in the absence of an electron donor. If present the electron donor may be used in amounts from 0 up to 0.3 mmol per g of silica. Suitable electron donors are well known to those skilled in the art and include tetrahydrofuran (THF), dimethyl formamide (DMF), ethyl acetate, methyl isobutyl ketone and the like.

The catalyst may be used in a fluidized bed gas phase reactor or in a stirred bed gas phase reactor. These processes are well known to those skilled in the art. A broad general description of these types of processes is set out in the paper "Gas Phase Ethylene Polymerization: Production Processes, Polymer Properties, and Reactor Modeling", by Tuyu Xie, Kim B. McAuley, James C. C. Hsu, and David W. Bacon, Ind. Eng. Chem. Res. 1994, 33, 449–479.

Generally, a monomer feed comprising at least ethylene and one or more $C_{3-6}$ alpha-olefins is fed to a gas phase fluidized bed or stirred bed reactor. The monomer mixture optionally together with hydrogen and/or an inert gas are fed to the fluidized bed. In a fluidized bed reactor the velocity of the gas is sufficient to suspend the bed in the fluid flow of monomer and other components. In a stirred bed reactor mechanical agitation serves to help suspend the bed. Generally a fluid bed reactor is vertical and a stirred bed reactor is horizontal. Concurrently with the monomers, a cocatalyst and a supported catalyst are fed to the bed. The monomer passing over the catalyst polymerizes on the catalyst and in the pores of the catalyst causing the particle to increase in size and to break. The resulting particle of polymer on catalyst grows as it resides in the catalyst bed. In a stirred tank reactor the bed is stirred to a discharge section and leaves the reactor. In a fluidized bed the reactor typically has a narrower section to keep the fluid velocity sufficiently high to fluidize the bed. There is an expanded zone at the top of the reactor to reduce the speed of the gas passing through the reactor so the polymer/catalyst particles fall back into the bed. The discharge is from the bed zone in the reactor.

In both the fluidized bed and stirred bed the polymer particles removed from the reactor are degassed to remove any volatile material and the resulting polymer (with entrained catalyst) may then be further treated (e.g. stabilizers added and pelletized if necessary).

Typically the resulting polymer will comprise from 85 to 100 mole % of ethylene and from 0 to 15 mole % of one or more $C_{3-6}$ alpha-olefins. The polymer should have a molecular weight (weight average, Mw) greater than 50,000. The polymers prepared according to the present invention will have a polydispersity (Mw/Mn) from 3.5 to 7, preferably from 3.75 to 6.

The polymers may be compounded with the usual additives such as heat and light stabilizers (typically hindered phenol type stabilizers such as those sold by Ciba Geigy) and ultraviolet light stabilizers (such as hindered amine stabilizers sometimes referred to as HALS also sold by Ciba Geigy), processing aids such as the fluoroelastomers optionally in combination with waxes such as low molecular weight esters of polyethylene glycol (i.e. Carbowax) as sold by 3M and by DuPont.

The resulting polymers, depending on polymer properties, may be used in a number of applications such as film, injection molding and roto-molding.

The present invention will now be illustrated by the following non-limiting examples.

Catalyst Synthesis

Support Preparation

Silica (200 g) was predried at 150° C. for a day prior to heating it to 200° C. under a flow of air for 2 hours. After this time the air was turned off and nitrogen was slowly passed over the silica and the temperature was increased to 600° C. for 6 hours. The oven was then turned off and the silica was allowed to cool to room temperature. The silica was then transferred to a reaction vessel and hexane (1 L) was added. With stirring, triethylaluminum (71.4 mL of a 25 weight % TEAL in n-hexane) was added over 10 minutes at room temperature. After stirring the slurry for 15 minutes at room temperature the solvent was removed under vacuum. After the silica reached a free-flowing state, it was dried thoroughly under a high vacuum (0.1 mm of Hg) at 60° C. for 2 hours.

Catalyst Preparation

To a slurry of a prepared support (15 g) in pentane (100 mL) at 0° C. was added $TiCl_4$ (0.42 g in 10 mL of pentane) over 10 minutes. After the addition was complete, the cold bath was removed and the reaction mixture was stirred for 2 hours. After this time the solvent was removed under vacuum. This procedure was repeated sequentially for the addition of MAGALA (24.3 g, 1.75 weight % Mg, 0.24 weight % Al in heptane) and finally t-butyl chloride (3.24 g diluted with 10 mL pentane). After drying, the catalyst was stored in a glove box.

Polymerization of the Above Catalyst

In a 75 L stirred bed catalytic reactor at 88° C. containing hydrogen, nitrogen, ethylene and hexene (as described in Table 1) the above catalyst was added at a rate of 0.5 g per hour. The Al, in the co-catalyst (TEAL),:Ti ratio was maintained at approximately 40:1. Under these conditions an LLPDE was formed whose properties are shown in Table 1.

TABLE 1

| | |
|---|---|
| $C_6H_{12}/C_2H_4$ molar flow ratio | 0.077 |
| $H_2/C_2H_4$ molar gas ratio | 0.085 |
| Nitrogen (mole %) | 52.2 |
| $MI_{2.16}$ | 0.78 |
| MFR | 37.3 |
| Bulk density (lb/ft$^3$) | 24.1 |

COMPARATIVE EXAMPLE

For comparative purposes a catalyst prepared following U.S. Pat. No. 4,302,566) was used to produce an LLDPE. In a 75 L stirred bed catalytic reactor at 88° C. containing hydrogen, nitrogen, ethylene and hexene (as described in Table 2), the above catalyst was added at a rate of 0.17 g per hour. The Al, in the co-catalyst (TEAL),:Ti ratio was maintained at approximately 40:1. Under these conditions an LLPDE was formed whose properties are shown in Table 2.

TABLE 2

| | |
|---|---|
| $C_6H_{12}/C_2H_4$ molar flow ratio | 0.077 |
| $H_2/C_2H_4$ molar gas ratio | 0.19 |
| Nitrogen (mole %) | 48.4 |
| $MI_{2.16}$ | 0.97 |
| MFR | 26.5 |
| Bulk density (lb/ft$^3$) | 24.7 |

When the melt flow ratio (MFR) in Table 1 (37.3) is compared to the MFR in Table 2 (26.5) it is evident that the molecular weight distribution of the polymer prepared in accordance with the present invention is significantly broader than the molecular weight distribution for the polymer prepared with the catalyst of the prior art.

What is claimed is:

1. A process conducted in a hydrocarbon solvent at a temperature from 0° C. to 100° C. for preparing a catalyst for the gas phase polymerization of alpha olefins comprising:
   a. contacting a dehydrated silica support comprising from 0.1 to 3.0 weight % an aluminum compound of the formula $Al^1(R^1)_aX_b$ wherein each $R^1$ is independently selected from the group consisting of $C_{1-6}$ alkyl radicals, X is selected from the group consisting of Cl and Br, a and b are 0 or an integer from 1 to 3 provided the sum of a+b=3; with
   b. a titanium compound of the formula $Ti(R^5)_y(Cl)_z$ wherein each $R^5$ is selected from the group consisting of $C_{2-6}$ alkyl and alkoxide radicals and phenyl and benzyl radicals, y and z are 0 or an integer from 1 to 4 provided that the sum of y+z=4 to provide from 0.25 to 1.0 weight % of Ti based on the silica; with
   c. a mixture of an aluminum compound of the formula $Al^2(R^2)_nX_m$ wherein each $R^2$ is independently selected from the group consisting of $C_{1-6}$ alkyl radicals, X is selected from the group consisting of Cl and Br, m and n are 0 or an integer from 1 to 3 provided the sum of n+m=3, and $Mg(R^3)_2$ wherein each $R^3$ is independently selected from the group consisting of $C_{1-6}$ alkyl radicals wherein the weight ratio of Mg:$Al^2$ in said mixture is from 0.5:1 to 16:1 to provide from 0.5 to 4.0 weight % of Mg based on the weight of the silica and a ratio of $Al^1+Al^2$ to Mg from 0.4:1 to 3:1, on the resulting product; and contacting the resulting product; with
   d. a secondary or tertiary alkyl halide of the formula $R^4Cl$ wherein $R^4$ is selected from the group consisting of $C_{3-6}$ alkyl radicals to provide a weight ratio of Cl:Mg from 1.5:1 to 6:1 in the resulting product; and
   e. optionally contacting the resulting product with from 0 up to 0.3 mmol of an electron donor per gram of silica.

2. The process according to claim 1, conducted at temperatures from 0° C. to 80° C.

3. The process according to claim 2, wherein X is Cl.

4. The process according to claim 3 wherein m is 0 and b is 0.

5. The process according to claim 4, wherein $R^1$ and $R^2$ are selected from the group consisting of methyl, ethyl, and butyl radicals, $R^3$ is selected from the group consisting of ethyl and butyl radicals, and $R^4$ is a butyl radical.

6. The process according to claim 5, wherein $R^5$ is an alkoxy radical.

7. The process according to claim 5 wherein y is 0.

8. The process according to claim 5, conducted in one reactor at a temperature from 5° C. to 80° C. with the removal of the solvent after step d at a temperature from 5° C. to 80° C.

9. The process according to claim 8, wherein the removal of solvent is conducted under vacuum from 0.1 to 500 mm of Hg at a temperature from 10° C. to 80° C.

10. The process according to claim 8, wherein the removal of solvent is conducted at a temperature from 30° C. to 80° C. by passing a stream of inert gas through said solvent.

11. The process according to claim 5, conducted in one reactor wherein the solvent is removed at least once prior to step d, and after step d.

12. The process according to claim 11, wherein the removal of solvent is conducted under vacuum from 0.1 to 500 mm Hg at a temperature from 10° C. to 80° C.

13. The process according to claim 11, wherein the removal of solvent is conducted at a temperature from 30° C. to 80° C. by passing a stream of inert gas through said solvent.

* * * * *